US005757899A

United States Patent [19]

Boulware et al.

[11] Patent Number: 5,757,899
[45] Date of Patent: May 26, 1998

[54] CALL SCREENING USING SUBSCRIBER SPECIFIED TIMERS AND SCHEDULES

[76] Inventors: Joni R. Boulware, 9862 E. Caron, Scottsdale, Ariz. 85258; Peggy S. Schwend, 4201 W. Monte Cristo, Phoenix, Ariz. 85023-3767; Joshua D. Staller, 5177 E. Nicols Ln., Littleton, Colo. 80122

[21] Appl. No.: 921,979

[22] Filed: Aug. 28, 1997

Related U.S. Application Data

[63] Continuation of Ser. No. 758,793, Dec. 3, 1996, abandoned, which is a continuation of Ser. No. 505,497, Jul. 21, 1995, abandoned.

[51] Int. Cl.[6] .................... H04M 3/50; H04M 1/64; H04M 15/06; H04M 7/00
[52] U.S. Cl. .................... 379/196; 379/88; 379/142; 379/207; 379/210; 379/221
[58] Field of Search .................... 379/67, 88, 89, 379/142, 188, 196, 197, 199, 200, 201, 207, 210, 211, 214, 219, 220, 221

[56] References Cited

U.S. PATENT DOCUMENTS

| | | | |
|---|---|---|---|
| 3,963,875 | 6/1976 | Gueldenpfennig | 379/208 |
| 4,096,356 | 6/1978 | Burtness et al. | 379/198 |
| 4,277,649 | 7/1981 | Sheinbein | 379/201 |
| 4,313,035 | 1/1982 | Jordan et al. | 379/207 |
| 4,351,986 | 9/1982 | Fechalos | 379/163 |
| 4,783,796 | 11/1988 | Ladd | 379/67 |
| 4,809,321 | 2/1989 | Morganstein et al. | 379/211 |
| 4,850,609 | 7/1989 | Hashimoto | 379/51 |
| 4,866,762 | 9/1989 | Pintar | 379/200 |
| 4,899,358 | 2/1990 | Blakley | 379/284 |
| 4,994,797 | 2/1991 | Breeden | 340/825.44 |
| 5,029,196 | 7/1991 | Morganstein | 379/67 |
| 5,058,152 | 10/1991 | Solomon et al. | 379/67 |
| 5,109,408 | 4/1992 | Greenspan et al. | 379/197 |
| 5,276,731 | 1/1994 | Arbet et al. | 379/199 X |
| 5,329,578 | 7/1994 | Brennan et al. | 379/67 |
| 5,361,295 | 11/1994 | Solomon et al. | 379/67 |
| 5,375,161 | 12/1994 | Fuller et al. | 379/211 X |
| 5,388,150 | 2/1995 | Schneyer et al. | 379/67 |
| 5,436,957 | 7/1995 | McConnell | 379/88 |
| 5,467,388 | 11/1995 | Redd, Jr. et al. | 379/201 X |

OTHER PUBLICATIONS

Pierce et al., "Meeting Private Needs With the Public Network", Bellcore Exchange, pp. 8–13, Dated Jan. 1988.
Berman et al., "Perspectives on the AIN Architecture", IEEE Communications Magazine, pp. 27–32, Dated Feb. 1992.

*Primary Examiner*—Harry S. Hong
*Attorney, Agent, or Firm*—Thomas R. Marsh; Peter J. Kinsella

[57] ABSTRACT

A call screening service and system are disclosed for a telephone switching network. The call screening service provides a service subscriber with a number of call screening features that are subscriber setable via an automated call screening configuration subsystem internal to the telephone switching network. In particular, the call screening service allows the subscriber to set multiple call screening service activation schedules as well as to set both call screening activation and deactivation timers for immediately activating and deactivating the call screening service, respectively. An important aspect of the present invention allows the subscriber to deactivate the call screening service for a time and at the expiration of this time, the call screening service automatically reverts to using any schedules the subscriber has set for activating the call screening service.

2 Claims, 13 Drawing Sheets

CALL SCREENING USING SUBSCRIBER SPECIFIED TIMERS AND SCHEDULES

This application is a continuation of application Ser. No. 08/758,793, filed Dec. 3, 1996, now abandoned, which is a continuation of application Ser. No. 08/505,497, filed Jul. 21, 1995, now abandoned.

FIELD OF THE INVENTION

The present invention relates to a telephony call screening system and, in particular, to a call screening system having both subscriber setable call screening activation schedules as well as call screening deactivation timers wherein the call screening service automatically reverts to the subscriber's schedules when a deactivation timer expires.

BACKGROUND OF THE INVENTION

Telephone subscribers frequently complain about interruptions to telephone calls at inconvenient times by a caller to whom they do not wish to speak or at times when they do not wish to be disturbed. Since typical households may have three or more telephones, blocking calls so that they do not disturb a subscriber can be inconvenient and/or laborious. The usual means of stopping or blocking the ringing of phones in a household include: taking all telephone receivers off their hooks, unplugging all of the phones or forwarding all calls to an answering service. These solutions are not completely satisfactory; e.g., the forwarding of calls may be inconvenient and physically modifying the state of all phones in a household requires both time and effort. Further, there is a tendency to forget that the telephone system has been placed in such a configuration to block calls. Thus, calls may be missed that the subscriber would have desired to accept if he/she had been aware of the calls.

Therefore, it is desirable to have a flexible subscriber-controlled call screening capability that allows various options for screening calls including the setting and activating of various schedules as well as the capability to temporarily deactivate call screening and have it automatically reactivated once the temporary deactivation terminates.

SUMMARY OF THE INVENTION

The present invention is a call screening system and service that operates using a subscriber's existing telephone number wherein the system intercepts calls to the subscriber and determines, based on the subscriber's most current call screening management configuration how to process calls. In particular, upon receiving a call for a subscriber of the call screening service of the present invention, the service checks subscriber status information related to various subscriber specified call screening schedules and time intervals for determining whether the call screening service is activated or deactivated as well as the type of call screening to perform if the service is activated and whether callers have the option to be forwarded to another number. Furthermore, the subscriber may request the call screening system to be deactivated for a predetermined time interval wherein at the termination of the interval, the call screening system automatically reactivates at the next appropriate time period according to the previously entered schedules just as if there had been no deactivation of the service.

Thus, it is an object of the present invention to give the subscriber greater control and flexibility in the operation of the call screening service. In this regard, one aspect of the present invention allows a subscriber to call a predetermined call screening number provided by the telephony network provider and specify one or more schedules for automatically activating and deactivating the call screening system on a regularly repeated basis. Moreover, the present invention manages any overlapping or conflicting activation/deactivation instructions from the various schedules using the rule that if any schedule designates call screening to be on then calls are screened.

It is a further aspect of the invention that, such schedules may be also suspended and later restarted without re-entering the schedule(s). Thus, for unexpected occasions, the subscriber may activate the present invention to screen calls immediately and call back later to deactivate it. Alternatively, the subscriber may activate the present invention and, in addition, also specify a termination time for the call screening system to deactivate.

In another aspect of the invention related to subscriber control and flexibility, the subscriber may call the call screening system number to turn the call screening system off and, optionally, specify an activation time for the system to automatically reactivate.

Furthermore, it is an aspect of the present invention to provide an automated interface to the call screening system which can present the state of the call screening service to the subscriber whenever the subscriber calls the predetermined call screening service number. Moreover, the present invention may also announce, at the subscriber's request, when the next change in the call screening service is specified to automatically occur.

A further object of the present invention is to permit emergency calls to ring at the subscriber's telephone even when all other calls are blocked by activation of the call screening service. Thus, it is an aspect of the present invention to provide an announcement to subscriber callers giving them an option to enter a code or say "emergency" and thereby override any call blocking presently activated. Accordingly, when callers indicate they have an emergency they are further instructed to state their name and then wait on hold while the present invention attempts to reach the subscriber. While the caller is on hold, the system rings the subscriber's phone and after the subscriber answers, the present invention announces that there is an emergency call waiting and plays the recorded name of the caller who is on hold. Subsequently, a further announcement asks the subscriber to choose to accept or reject the call. If accepted, the present invention connects the caller and the subscriber. However, if the subscriber rejects the call, the caller is informed that no connection with the subscriber can be made and the call is terminated or routed to a subscriber's messaging service.

Another object of the present invention is to permit simple, rapid and automated establishment of the call screening service for a subscriber. Thus, it is an aspect of the present invention to provide an interactive tutorial subsystem which automatically presents a subscriber who calls the predetermined call screening service number with assistance in setting the features of the call screening service. The tutorial subsystem supplements an automated menu-driven interface of the call screening service wherein the tutorial subsystem provides a step-by-step progression through predetermined features of the call screening service. Further, the tutorial subsystem retains a history of the features that have been set or intentionally skipped by the subscriber so that the subscriber need not needlessly review portions of the tutorial deemed irrelevant. Thus, the subscriber may skip certain features of the call screening service that are not desired and hang up in the middle of the tutorial without losing the setup of the completed features. Accordingly, a revised tutorial is presented to the subscriber in a subsequent call to the call screening service number wherein the revised tutorial reviews the completed features and presents only the uncompleted feature setups to the subscriber.

Other features and benefits of the present invention will become apparent from the detailed description with the accompanying figures contained hereinafter.

DETAILED DESCRIPTION

Figure 1:
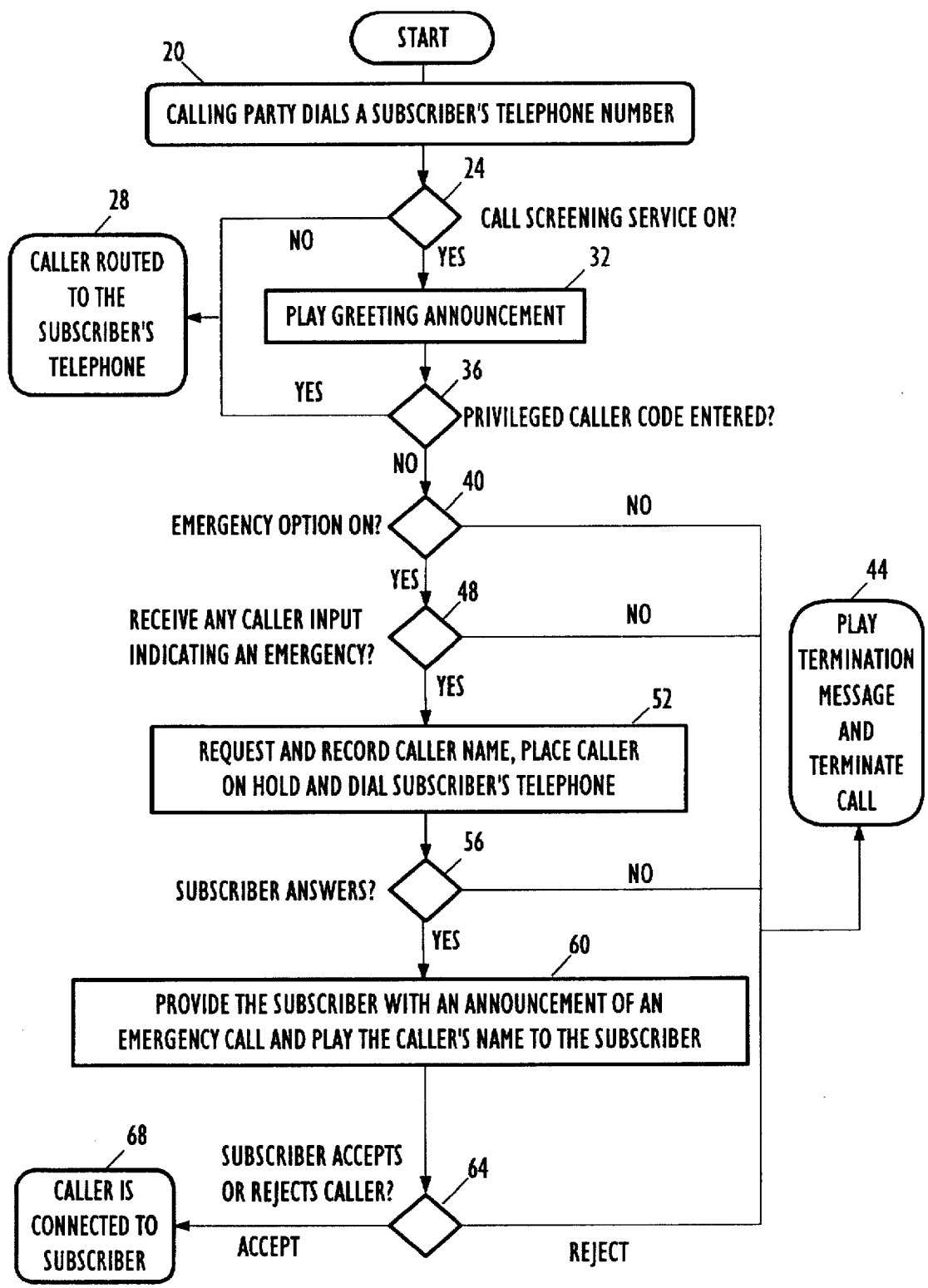
FIG. 1 is a high level flowchart providing the steps performed in screening a call to a subscriber having the service of the present invention.

FIG. 1 provides a high level flowchart of the present call screening system and service invention for screening a call to a subscriber. Commencing with step 20, a caller dials the publicly available telephone number for a subscriber having the present call screening service. Subsequently, the telephony network providing the service of the present invention determines whether the service is on or off in step 24. In particular, note that the subscriber may turn the call screening service completely off manually or allow it to be automatically turned off by the one or more schedules that the subscriber has specified for activating and deactivating the call screening service. Thus, if the service is off, then no call screening is provided and the caller is routed directly to the subscriber's telephone in step 28. Alternatively, if the service is on, then in step 32 a recorded announcement is played to the caller indicating, for example, that the subscriber is presently unavailable and that the caller may try again later or, alternatively, the caller may be routed to the subscriber's messaging service for leaving a message. Subsequently, in step 36 the present invention monitors, for a predetermined time, any caller activity while the caller remains off-hook for determining if a privileged caller code is entered that would allow the caller to be routed to the subscriber regardless of the status of the call screening service. In the present embodiment, the privileged caller code is a 4-digit code input by the subscriber of the present invention, via a system administration telephone number, that allows a subscriber caller who has been provided with the code to be routed directly to the subscriber's telephone upon entering the code when the call screening service is active. Thus the subscriber may provide this code to potential callers so that these callers may circumvent having their calls screened when calling the subscriber, as illustrated by the flow path from step 36 to step 28.

Alternatively, if no privileged caller code is entered, then a determination is made as to whether the emergency breakthrough option has not been deactivated by the subscriber (the breakthrough option is by default active). When the emergency breakthrough is activated (i.e., "on"), this option allows a caller to specify that the call to the subscriber is an emergency and, therefore, the call screening service attempts to contact the subscriber even though call screening has been activated. If the emergency breakthrough option has been deactivated (i.e., "off"), then step 44 is encountered wherein a call termination message is played to the caller and the call is terminated. If, instead, the emergency option is activated or on, the service of the present invention monitors the caller's line, for a predetermined time interval, to determine if the caller has input any indication that there is an emergency. Note that preferably if, and only if, the emergency breakthrough option is on, the announcement played to the caller in step 32 will indicate to the caller that an emergency contact with the subscriber will be attempted if the caller requests. Preferably, such an emergency request may be provided by having the caller say a predetermined word such as "emergency" and/or input a predetermined code such as dialing an asterisk. Thus, if the caller does not indicate that there is an emergency breakthrough, then step 44 is executed for terminating the call. Alternatively, in step 52 the caller is requested to give his/her name for recording, the caller is then placed on hold and the service dials the subscriber's telephone number in an attempt to contact the subscriber. In step 56, the service determines whether the subscriber's telephone is answered. If the subscriber's telephone is not answered, then a termination message is played in step 44. However, if the subscriber's telephone is answered, then in step 60 a recorded announcement is played through the subscriber's telephone indicating that an emergency call is holding and the recording of the caller's name is played. Following this, in step 64 a determination is made as to whether the caller's emergency call is accepted. Preferably, an indication for the acceptance or rejection of the caller's emergency call may be provided by entering a code such as dialing a one for acceptance and two for rejection and/or staying off-hook for acceptance or hanging up for rejection. Thus, depending on the input received from the subscriber's telephone, the caller is connected to the subscriber in step 68 or the caller receives a termination message as in step 44.

Figure 2:
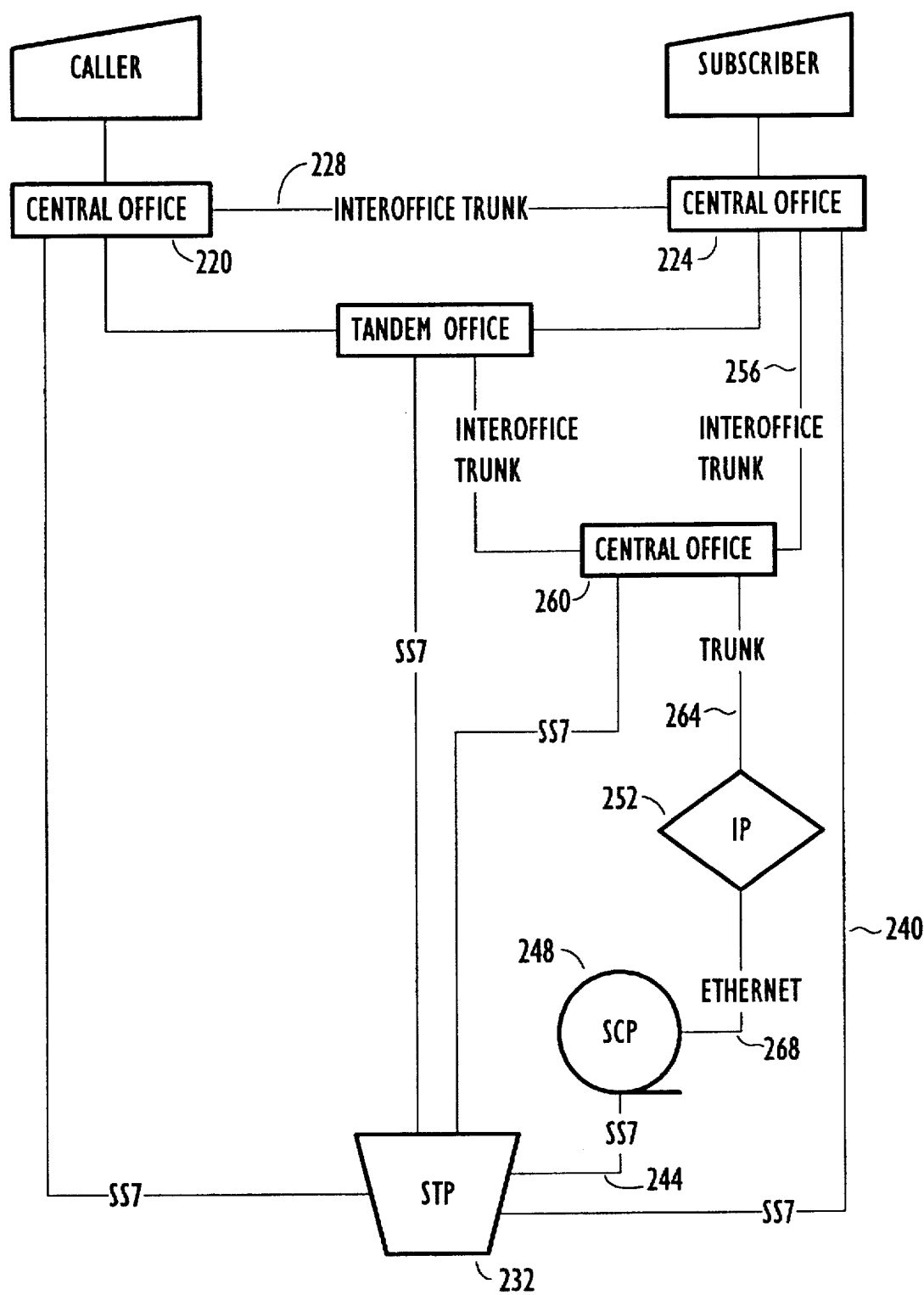
FIG. 2 is a high level block diagram presenting the internal components of a telephony network that are used in a preferred embodiment of the present invention.

Referring now to FIG. 2, a block diagram is presented that provides a preferred embodiment of the present invention that is internal to a telephony network. Accordingly, FIG. 2 will be described both in terms of the communication or signal flow through the network as the flow relates to the flowchart of FIG. 1 and to illustrate further functional aspects of the present invention as described in flowcharts 3–9. Thus, when a caller attempts a call to the subscriber, the caller's central office 220 is activated to provide a connection from the caller's telephone to the central office 224 for the subscriber via interoffice trunk 228. Preferably, the subscriber's central office 224 will be configured, via for instance a triggering mechanism, well known in the art, to contact a service control point (SCP) 248 via SS7 signaling link 240, signal transfer point (STP) 232 and SS7 signaling link 244. In contacting the SCP 248, the subscriber's telephone number is supplied to the STP 232 and subsequently the STP 232 uses this number for determining which SCP to route the request for call screening information; i.e., for the configuration of the subscriber's call screening service. In particular, there may be a number of subscriber databases distributed throughout the telephony network for describing subscriber configurations of network services. In one preferred embodiment of the present call screening invention, the call screening service configuration information may reside on any one of a number of service control points (SCP) such as SCP 248. Thus, the STP 232 determines that SCP 248 provides access to the present subscriber's call screening configuration information and routes the central office 224 request for call screening information to the SCP 248. Note that the request includes the subscriber's telephone number which is used as an index for retrieving information indicating whether the call screening service is on or off. Subsequently, as in step 24 of FIG. 1, the SCP 248, using the subscriber's telephone number, determines whether the service is on or off and, if off, then instructs the subscriber's central office 224 (via SS7 signaling link 244, STP 232 and SS7 signaling link 240) to route the caller's call to the subscriber's telephone as in step 28 of FIG. 1. Alternatively, if the service is on, then the SCP 248 determines a routing number for routing the caller to an intelligent peripheral (IP) such as IP 252. Thus, in this latter case, the SCP 248 instructs the subscriber's central office 224 to route the caller's call to a telephone number for accessing the IP 252 via interoffice trunk 256, central office 260 and trunk group 264. The IP 252, in turn, queries the SCP 248, via ethernet connection 268, for subscriber call screening configuration information used in performing the steps 32 through 68 of FIG. 1. That is, the interactions as provided in steps 32 through 68 between the caller and the service of the present invention are more precisely between the caller and the IP 252 via central office 220, interoffice trunk 228, central office 224, interoffice trunk 256, central office 260 and trunk group 264. Thus, eventually IP 252 plays a termination message to the caller and either terminates the call as in step 44 of FIG. 1 or, alternatively, the IP 252 instructs the subscriber's central office 224 to connect the caller with the subscriber's telephone by routing the caller to the subscriber, via trunk group 264, central office 260, intertrunk 256, to central office 224, as in step 68 of FIG. 1. As an aside, note that in the present embodiment of the invention, the subscriber's central office 224 queries the SCP 248 upon each call to the subscriber's number for instructions for routing the call. Further, note that the SCP 248 determines which calls are to be routed to the subscriber's telephone when the call screening service is active by examining the telephone number of the requestor (e.g., caller) requesting contact with the subscriber. That is, when either a caller or the IP 252 requests that a call be routed to the subscriber's telephone, the SCP 248 examines the requester's telephone number (which accompanies all such requests to the subscriber's central office 224) and subsequently sends instructions to route the call to the subscriber only if the requestor is an internal telephony device such as IP 252.

Referring now to FIG. 3, this figure provides a high level flowchart of the steps performed by the SCP 248 and IP 252: (1.0) when a determination must be made in step 24 of FIG. 1 as to whether the call screening service is on or off; or (1.1) when the subscriber dials a predetermined call screening service administration telephone number to update and/or query the service as to whether it is screening calls or not.

Figure 3A:
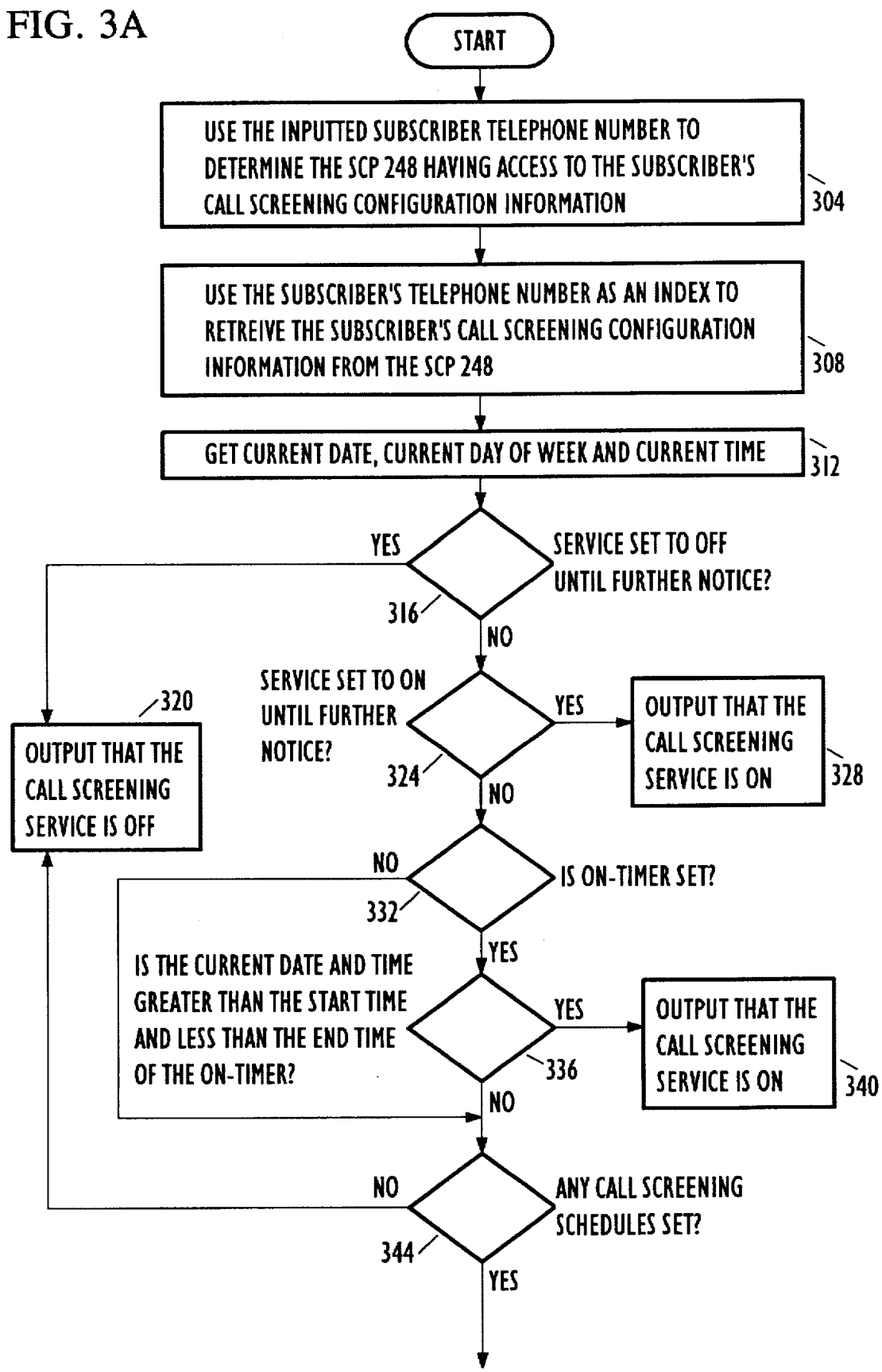
FIGS. 3A and 3B present a flowchart of the high level steps performed in determining if the call screening service of the present invention is currently figured to screen calls.
Figure 3B:
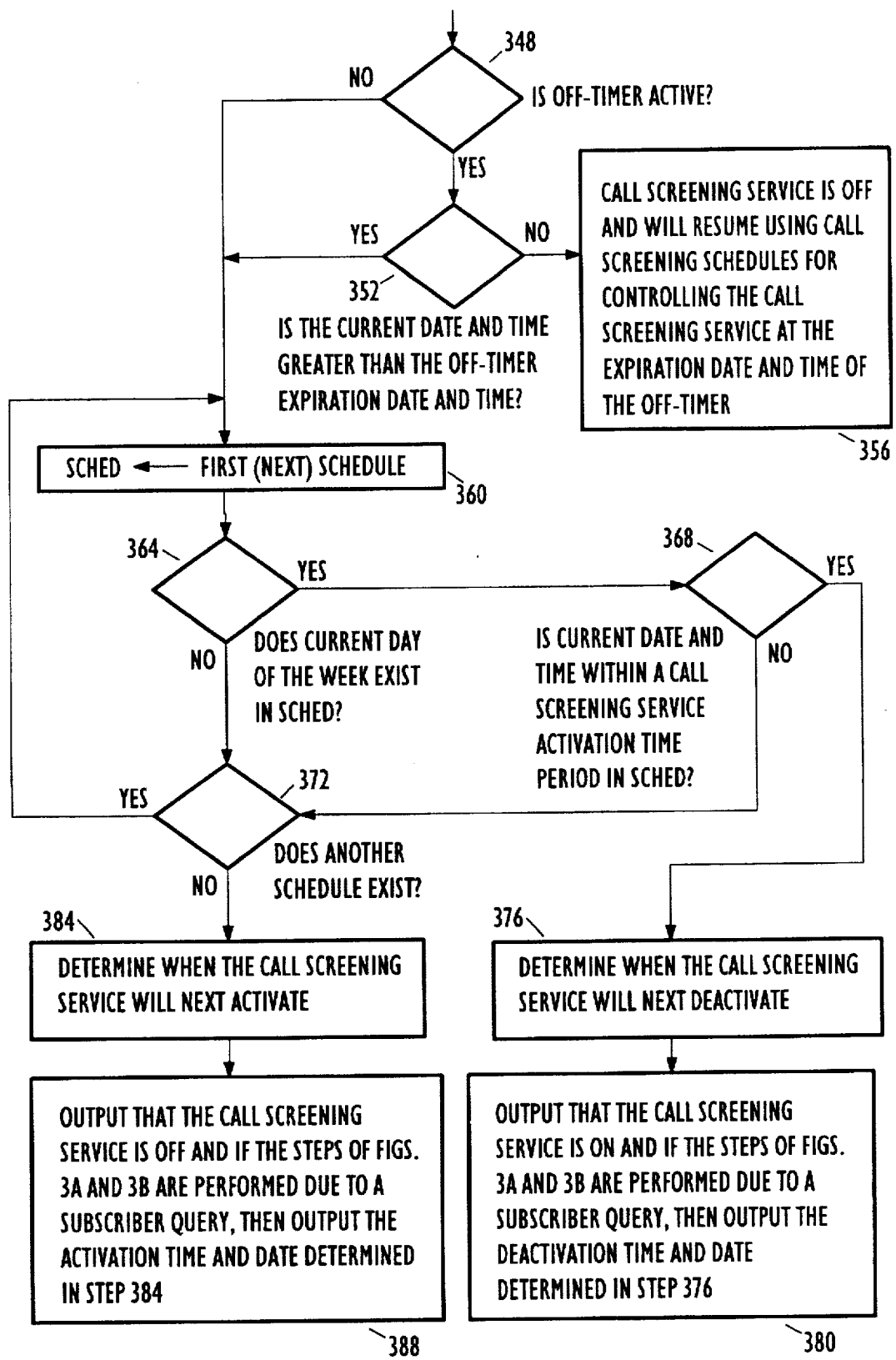

Accordingly, in step 304 of FIG. 3 the subscriber's public telephone number is supplied as input and is used to determine the SCP 248 having the subscriber's call screening information. Subsequently, in step 308 the SCP 248 uses the subscriber's telephone number as an index for retrieving the subscriber's call screening service information, and in particular for determining whether the service is screening calls or not (i.e., on or off respectively). In step 312, the SCP 248 retrieves the subscriber's current time, date and day of the week. Subsequently in step 316, based on the retrieved call screening configuration information, a determination is made as to whether the call screening service is off until further notice. If so, then step 320 is performed wherein an indication is output to the subscriber's central office 224 to route the caller to the subscriber's telephone number. Alternatively, if the call screening service is not off until further notice, then in step 324 a determination is made as to whether the call screening service is on until further notice. If so, then in step 328 an indication is output to the central office 224 to route the call to a telephone number that will connect the call to IP 252. However, if instead, the call screening service is not on until further notice, then in step 332 a determination is made as to whether a call screening service "ON-timer" is set. That is, a determination is made in step 332 as to whether the subscriber has called the administrative number for the service and specified that the service is to screen calls that occur between the time a subscriber activates the "ON-timer" and the subscriber specified ending time. If the "ON-timer" is set in step 336, then in step 336 a determination is made as to whether the current time, date and/or day is included in the time interval corresponding to the "ON-timer" wherein the call screening service is to be on. If the result of step 336 is affirmative, then in step 340 an indication is output to the central office 224 to route the call to the telephone number that will connect the call to IP 252. Furthermore, if the present activation of the module (performed on the SCP 248) corresponding to the flowchart of FIGS. 3A and 3B is due to a query by the subscriber, then this latter step further indicates that the call screening service is being controlled by a timer and will further specify when the timer is to deactivate.

Alternatively, if in step 332 it is determined that the "ON-timer" is not set, then a step 344 is encountered wherein a determination is made as to whether there are any call screening schedules that have been set by the subscriber. If no schedules have been set, then there is no further way in which the call screening service may be activated. Therefore, the call screening service is off until further configuration changes by the subscriber. Thus, control is passed to step 320 for outputting an indication to the central office 224 to route the call to the subscriber's telephone. Conversely, if there are schedules that have been set by the subscriber, then in step 348 a determination is made as to whether an "OFF-timer" has been set. That is, a determination is made as to whether the subscriber has configured his/her call screening service such that a timer has been set which will guarantee that the call screening service is off until a subscriber specified re-start date and time for reverting back to using the schedules for activating and/or deactivating the call screening service. Thus, in the present embodiment of the invention, the subscriber need only specify that the service is to be turned off and the call screening service will automatically determine a call screening service date and time when the "OFF-timer" is to become inactive and thereby allowing the call screening schedules to provide the time periods for activating and deactivating the call screening service. Thus, if the "OFF-timer" is active then in step 352, a determination is made as to whether the current date and time is greater than the date and time that the "OFF-timer" is to expire. If the "OFF-timer" has not expired, then in step 356 an indication is output to the central office 224 to route the call to the subscriber's telephone. Further, note that if the present activation of the module corresponding to the flowchart of FIGS. 3A and 3B is due to a query by the subscriber then additional information is output indicating that the call screening service is being controlled by a timer that has the service turned off until the "OFF-timer" expiration date and time. Alternatively, if either the "OFF-timer" is inactive, as determined in step 348, or the "OFF-timer" has expired, as determined in step 352, then in steps 360 through 372 a determination is made as to whether there is a schedule that designates that the call screening service is to be on for the current day and time. More precisely, in step 360 the variable SCHED is assigned a first of the subscriber specified call screening service schedules. Subsequently, in step 364, a determination is made as to whether the current day of the week is designated in the schedule referred to by SCHED. Note that in the present embodiment of the invention there are one or more schedules which can be specified by the subscriber for the days Monday through Friday and in addition, there are one or more schedules which the subscriber can specify for the days Saturday and Sunday. Assuming that SCHED contains call screening service activation and/or deactivation information for the current day of the week, then in step 368 a determination is made as to whether the current date and time are within a call screening service activation time period for SCHED. If this latter test is negative, then step 372 is encountered wherein a determination is made as to whether another schedule exists that has not yet been examined. Further, note that step 372 is also encountered directly from step 364 if the current day of the week is not provided for in SCHED. Thus, if a determination is made in step 372 that there is another schedule to be examined, then the steps 364 through 372 will be repeatedly performed with the variable SCHED being assigned a next unexamined schedule until either the positive path from step 368 is taken or the negative path from step 372 is taken. Thus, if the positive path from 368 is taken, then the current date and time falls within an activation time period for the call screening service and in step 376 a determination is made as to when the call screening service will next deactivate. Note that this latter step is preferably only performed when the steps of FIGS. 3A and 3B are being invoked by a subscriber query. Further note that step 376 may be accomplished by determining the first call screening service activation time period specified by a schedule that is beyond the current date and time, and such that the end time of this activation time period is not included in another activation time period specified by another schedule for the call screening service. Following step 376, in step 380 an indication is output that the call screening service is on and if the present activation of the module corresponding to the flowchart of FIGS. 3A and 3B is due to a subscriber query, then the call screening deactivation time and date determined in step 376 is also output.

Referring now once again to step 372, if all schedules have been examined without finding the current date and time within an activation time period for a schedule, then step 384 is encountered wherein the next time and date is determined when the call screening service will become active. Note that, as in step 376, step 380 is preferably only performed when the steps of FIGS. 3A and 3B are being invoked by a subscriber query. Further note that step 380, as one skilled in the art will appreciate, may be accomplished by determining the earliest activation time period within a schedule that is after the current time and date. Subsequently, in step 388 an indication is output that the call screening service is presently off. Furthermore, if the present activation of the module corresponding to the flowchart of FIGS. 3A and 3B is due to a subscriber query, then the next call screening service activation time determined in step 384 is also output.

Figure 4A:
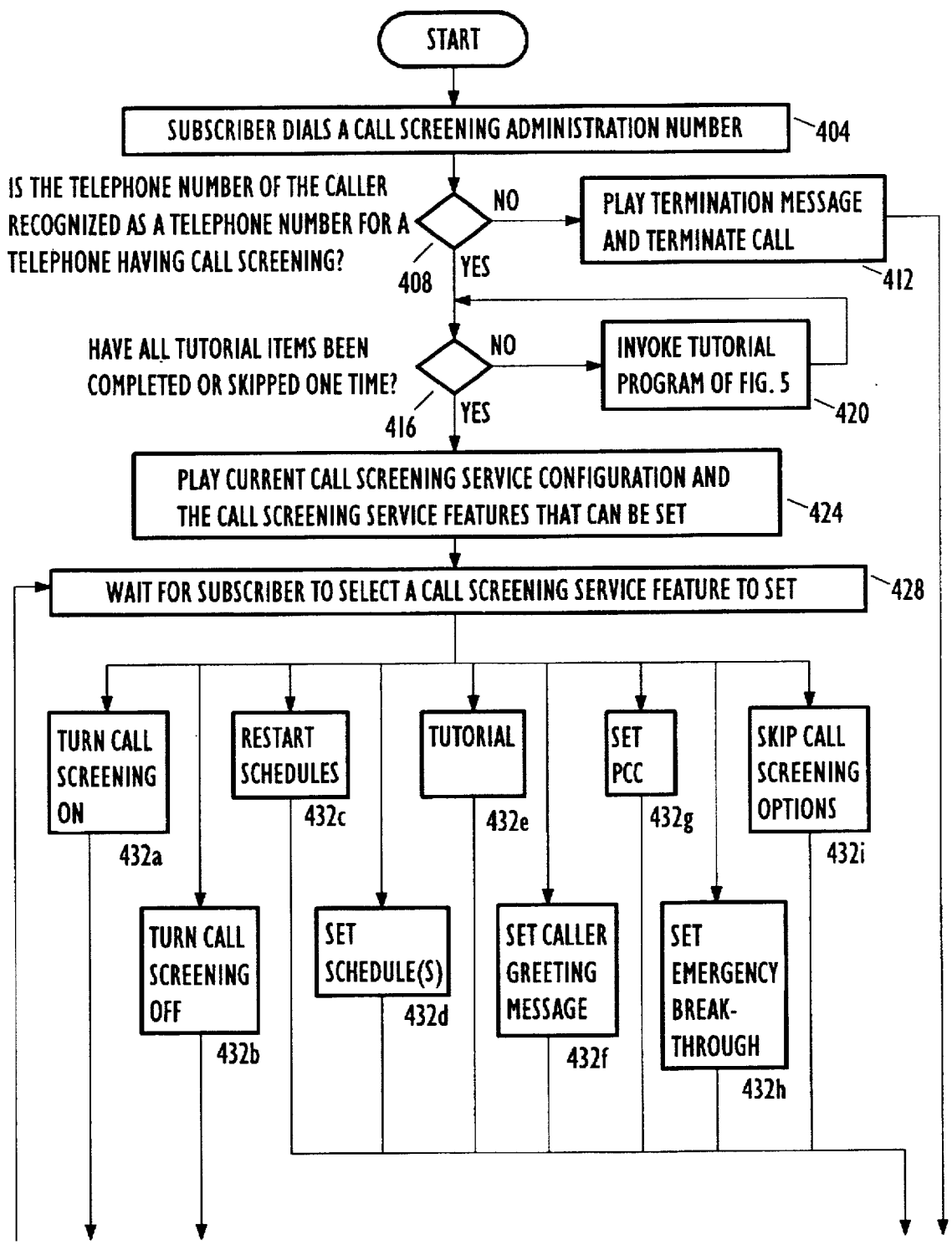
FIGS. 4A and 4B present a flowchart providing the high level steps performed when a subscriber for the call screening service of the present invention updates his/her call screening features for screening calls.
Figure 4B:
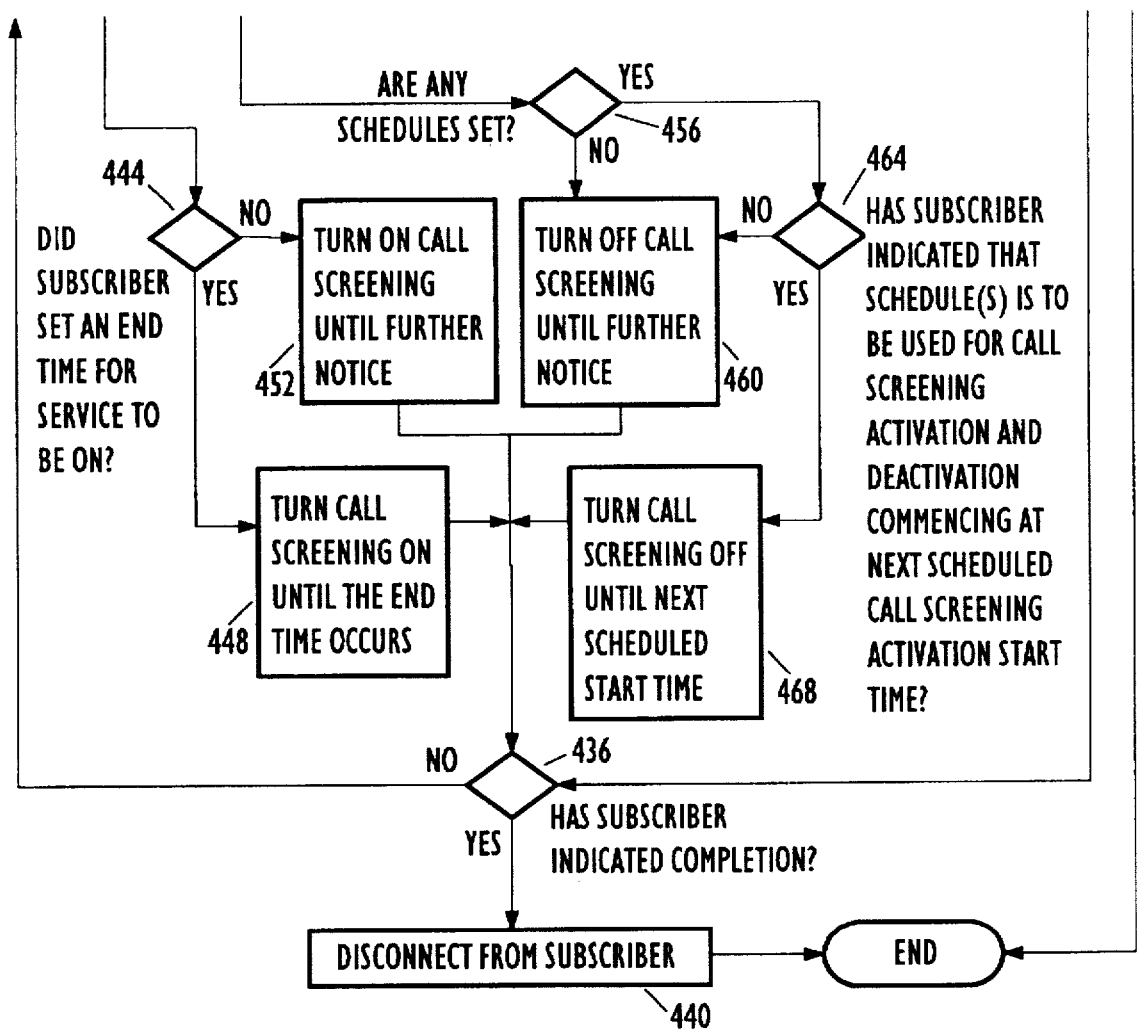
Figure 5A:
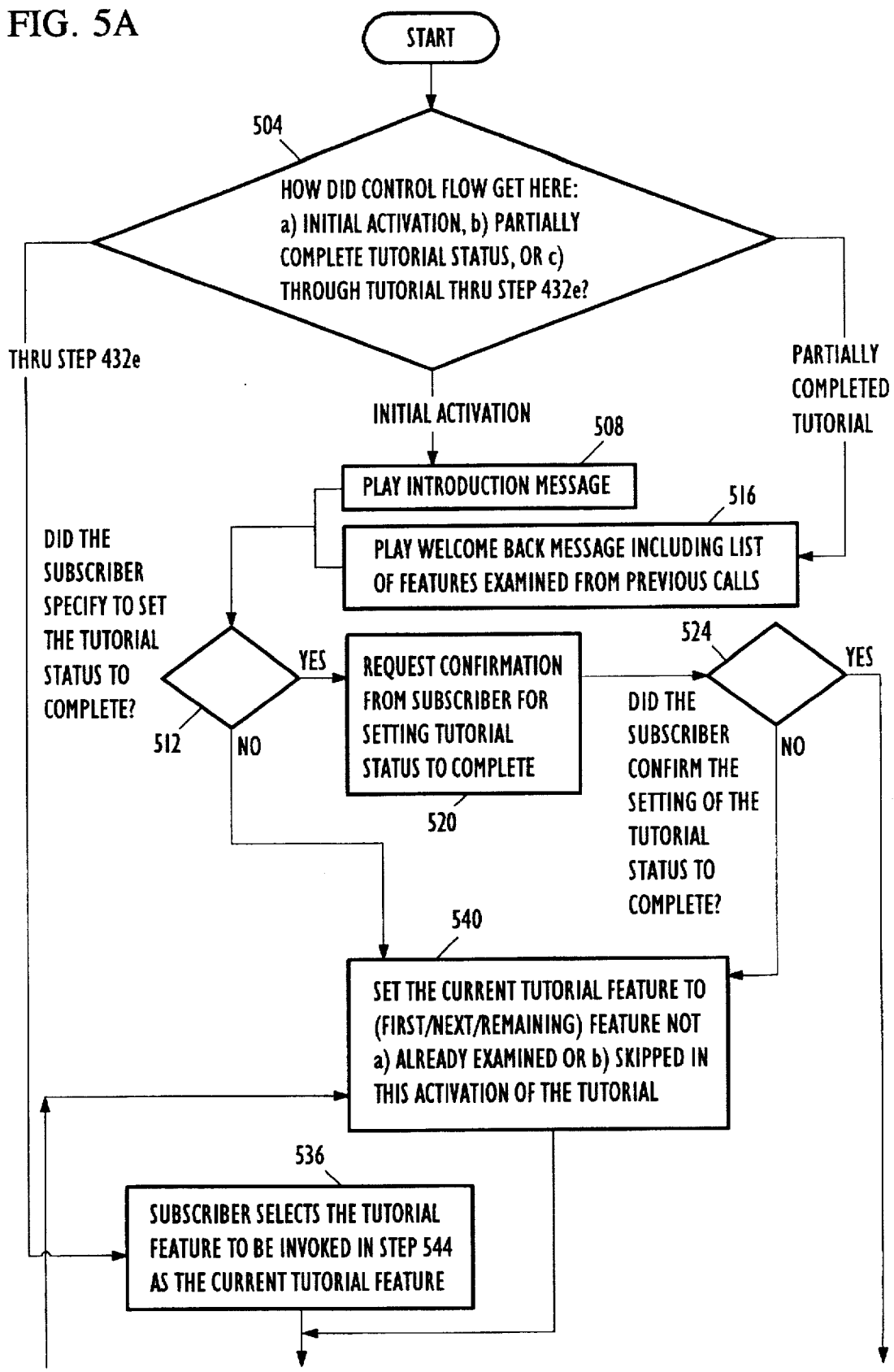
FIGS. 5A and 5B present a flowchart of the high level steps performed when the subscriber for the call screening service of the present invention enters a tutorial subsystem that assists the subscriber in setting the call screening features supplied by the present invention.
Figure 5B:
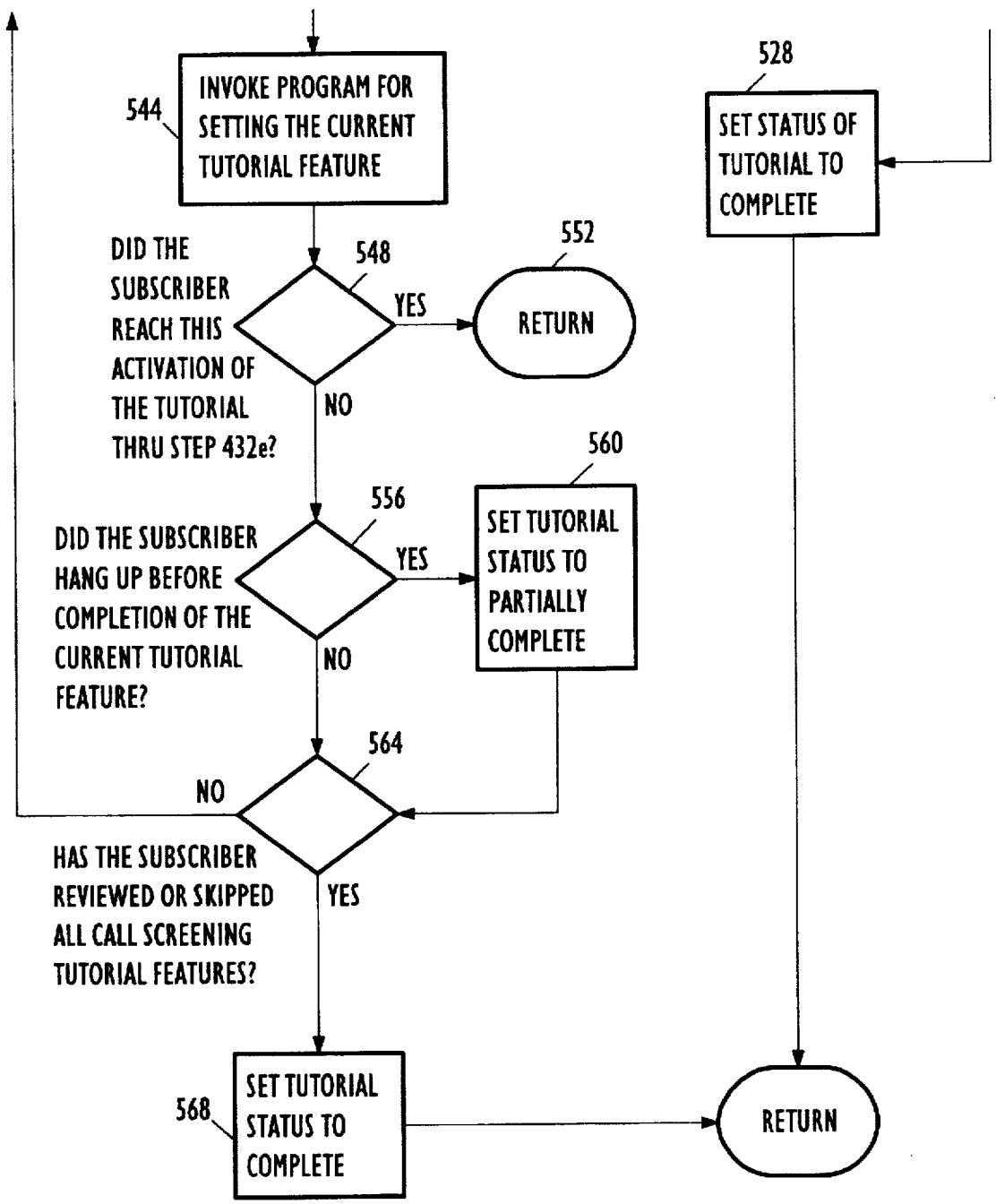

Referring now to FIG. 4, a high level flowchart is provided describing the interactions between the administrative subsystem of the present invention and a subscriber having the call screening service of the present invention when the subscriber desires to configure and/or reconfigure his/her call screening capabilities. Thus, in step 404 the subscriber dials a call screening service administration number to access the automated call screening configuration capabilities of the present invention. Accordingly, in step 408 the call screening system is supplied with the telephone number from which the caller is calling and determines in this step whether this telephone number belongs to a subscriber's telephone service having the call screening service of the present invention. If the caller's number is not found in the collection of call screening subscriber telephone numbers retained within subscriber data for the call screening service, then in step 412 a recorded call termination message is played and the call is terminated. Alternatively, if the telephone number of the caller is identified as a number of a subscriber to the call screening service, then in step 416 a determination is made as to whether the caller (i.e., subscriber) has had the opportunity to peruse the tutorial information regarding the configuring of the call screening service options. In particular, the tutorial explaining the call screening options is always activated the first time a new subscriber accesses the call screening service administration subsystem of FIG. 4. In addition, the tutorial will automatically be invoked each time the subscriber activates the call screening configuration subsystem of FIG. 4 if there are portions of the tutorial that have not been completed or explicitly skipped by the subscriber. For example, a subscriber who completes part of the tutorial and then hangs up will be automatically provided with the opportunity to complete or explicitly skip the remainder of the tutorial not completed or skipped previously. Thus, if there are portions of the tutorial of which the subscriber has not interacted, then in step 420 the tutorial program of FIG. 5 is invoked, as will be discussed in greater detail below. Alternatively, if the subscriber has either completed the tutorial or explicitly skipped each call screening tutorial feature, then in step 424 a message is played to the subscriber giving the current status of the subscriber's call screening service and the call screening service features that may be configured. Subsequently, in step 428 the program of FIG. 4 waits a predetermined time for the subscriber to select a call screening service feature to set or configure. Note that each call screening feature to which the subscriber has access is provided by one of the steps or blocks 432a through 432i which are briefly described as follows:

Step 432a: A step allowing the subscriber to indicate that the call screening service is to be turned on (i.e., activated) starting immediately and, in addition, allows the subscriber to enter an end time wherein the call screening service is no longer explicitly turned on according to this feature but rather is governed by other call screening activation and deactivation features such as any call screening schedules that have been set;

Step 432b: This step allows the subscriber to deactivate the call screening service immediately and optionally the subscriber may designate that the call screening service should reactivate according to any schedules that have been set when the next scheduled call screening activation time occurs. Note that the call screening features 432a and 432b override one another so that the most recent invocation of either of these feature takes precedence over the other;

Step 432c: This step allows the subscriber to immediately restart the use of any previously entered call screening schedules for activating and deactivating the call screening service. Thus, this feature allows the subscriber to override either of the features of 432a and 432b;

Step 432d: This step allows the subscriber to enter one or more schedules for activating and deactivating the call screening service. Note that the steps for this step are substantially similar to the steps described in FIG. 8 below regarding the setting of schedules within the tutorial feature of the present invention;

Step 432e: This step allows the subscriber to explicitly activate the call screening tutorial program represented in FIG. 5;

Step 432f: This step allows the subscriber to select and/or enter a caller greeting message that will be played to any caller of the subscriber while the call screening service is active;

Step 432g: This step allows the subscriber to enter a privilege caller code as described previously;

Step 432h: This step allows the subscriber to activate and/or deactivate the emergency breakthrough feature of the present invention as also described previously; and Step 432i: This step allows the subscriber to skip all the call screening options in case the subscriber decides against (re)configuring his/her call screening service.

Note that with the exception of 432a and 432b, the flow of control from all other call screening options 432c through 432i are followed by the step 436 wherein a determination is made as to whether the subscriber has indicated that further call screening features are to be configured. If not, then in step 440 the call screening service administrative subsystem disconnects from the subscriber and subsequently ends. Alternatively, if the subscriber indicates that there are further call screening features to be configured, then step 428 is again performed.

Returning now to steps 432a and 432b, further detail following these steps is provided in the steps 444 through 468. That is, referring first to step 444 (encountered after the subscriber has specified that the call screening service is to be immediately activated), a determination is made as to whether the subscriber set an end time after which the call screening service is no longer explicitly activated, but instead is to be governed by other call screening features. If so, then in step 448 the call screening service is turned on until this end time occurs by storing this end time in a field in the call screening information related to the subscriber. Alternatively, if no end time was set in step 432a, then step 452 is performed wherein the call screening service is turned on until the subscriber explicitly designates otherwise by, for example, reactivating the program for FIG. 4 and selecting 432b or 432c. Referring now to the steps following 432b, wherein the user has indicated that the call screening service is to immediately be turned off, in step 456 a determination is made as to whether there are any schedules that the subscriber has provided. If not, then in step 460 the call screening service is turned off until the subscriber explicitly indicates otherwise. Alternatively, if the subscriber has specified one or more call screening schedules, then step 464 is performed wherein a determination is made as to whether the subscriber has indicated that the schedule(s) is to be used for call screening activation and deactivation commencing at the next scheduled call screening activation start time. If not, then step 460 is again encountered wherein the call screening service is turned off until further notice. Alternatively, if step 464 yields an affirmative result, then in step 468 the call screening service is configured wherein it is only deactivated until the next scheduled start time. As an aside, note that the configuring of the call screening service according to features 432a and 432b preferably utilizes the setting of predetermined time values in database records associated with the call screening service. Thus, the end time specified in step 432a is entered into a database record associated with the subscriber's call screening service so that this time can be inspected as in step 336 of FIG. 3A. Moreover, a similar strategy is used when the subscriber designates that the call screening service is to be turned off until the next scheduled call screening activation start time.

FIG. 5 presents the high level steps associated with the call screening tutorial of the present invention. Accordingly, in step 504 a determination is made as to whether the present activation is due to: (a) an initial activation of the call screening service configuration program of FIG. 4, (b) a partially complete tutorial status wherein there is at least one tutorial feature that has not been completed or skipped by the subscriber, or (c) the execution of step 432e in FIG. 4. Referring now to steps 508 through 524, these steps are performed when the present activation of the tutorial is the first time it is activated or when the tutorial's status is not marked complete. Accordingly, these steps play an introductory message to the subscriber (steps 508 and 516) and subsequently determine whether the subscriber desires to set the tutorial status to complete, as in step 512, thereby skipping all tutorials for the call screening service features of steps 432a through 432h of FIG. 4. Alternatively, if the present activation of the tutorial is determined in step 504 to be due to step 432e of FIG. 4, then step 536 is performed wherein the subscriber selects a current tutorial feature to be invoked. Subsequently, in step 544 the current tutorial feature is performed, and in step 548 a determination is made that the present activation is from step 432e so that subsequently a return is performed in step 552.

Returning now to the flow paths ensuing steps 512 and 524, note that steps 540 through 564 include a loop for iterating through the tutorial call screening features (when the tutorial is not activated via step 432e) and for activating or skipping each tutorial feature. Thus, in step 540 a "current tutorial feature" is determined from a list of the tutorial features: (a) not already set up in this or a previous activation of the tutorial, and (b) not skipped in this particular activation of the tutorial. Subsequently, in steps 544 through 564 the current tutorial feature is performed (step 544) and a determination is made (step 548) as to whether the subscriber activated the tutorial through step 432e of FIG. 4. Assuming this latter determination is negative, in step 556 a determination is made as to whether the subscriber hung up before completion of the current tutorial feature. If so, then in step 560 the tutorial status is set to partially complete so that the tutorial may automatically be reactivated in step 416 of FIG. 4. Alternatively, in step 564 a determination is made as to whether the subscriber has reviewed or skipped all call screening tutorial features. If so, then in step 568 the tutorial status is set to complete and subsequently the tutorial ends with a return to the program of FIG. 4. However, if the subscriber has not reviewed or skipped all call screening tutorial features, then control flow is transferred back to step 540 wherein the next call screening tutorial feature that the subscriber has not previously examined or skipped is selected for activation in step 544. Note that the performance of step 540 and 544 presupposes that the subscriber is still on-line. Therefore, it is an implicit aspect of the present invention that certain exception handling features are performed if, for example, the subscriber hangs up at an unintended step. In such cases, the present invention uses an exception handling capability which, in the context of the tutorial activation, causes the flow of control to perform a step analogous to step 556 and subsequently perform a return to the program of FIG. 4 for further "cleanup" prior to termination of that program as well.

Figure 6A:
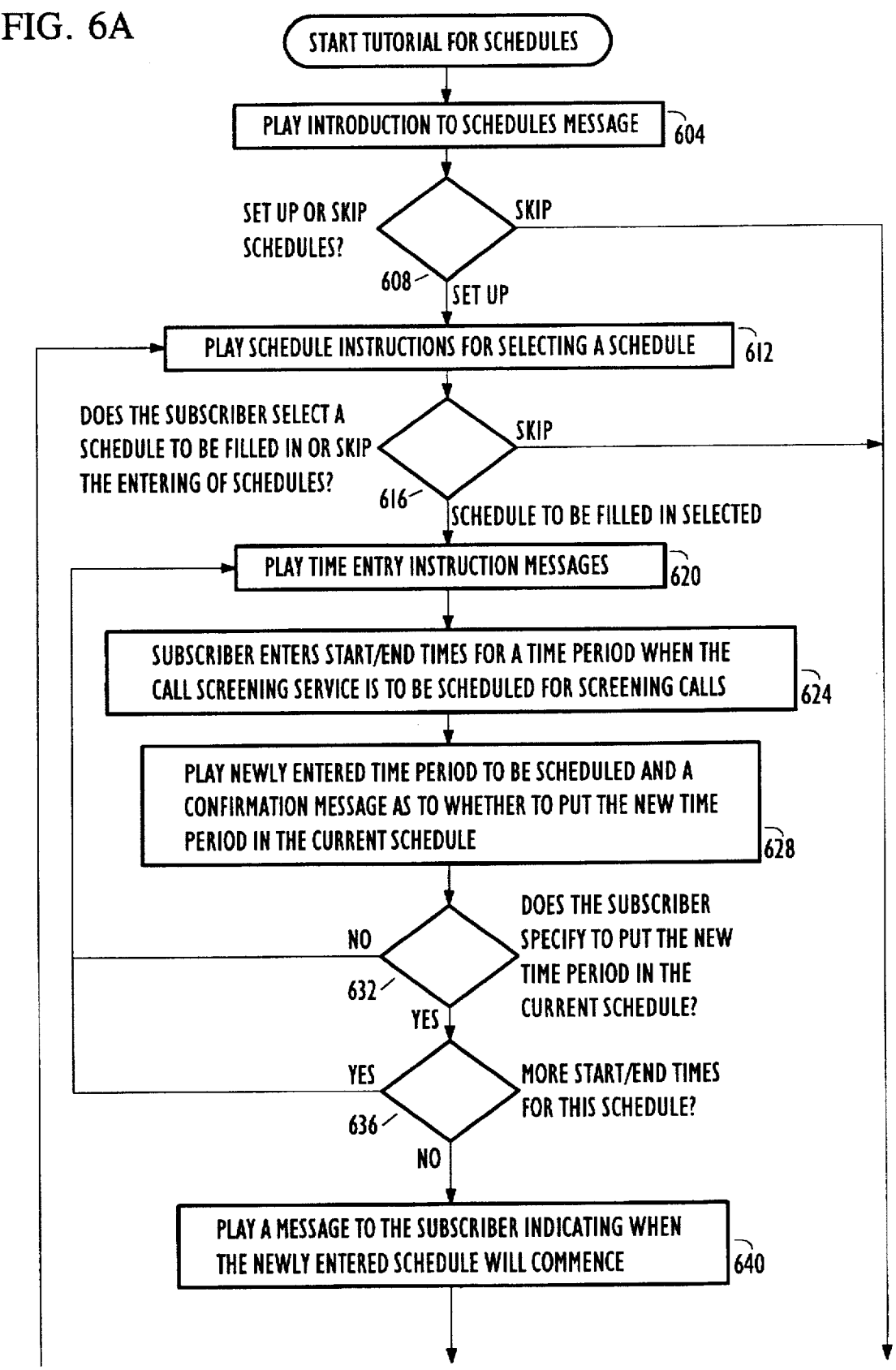
FIGS. 6A and 6B present a flowchart of the high level steps performed when the subscriber for the call screening service of the present invention interacts with the call screening tutorial feature for setting one or more call screening schedules.
Figure 6B:
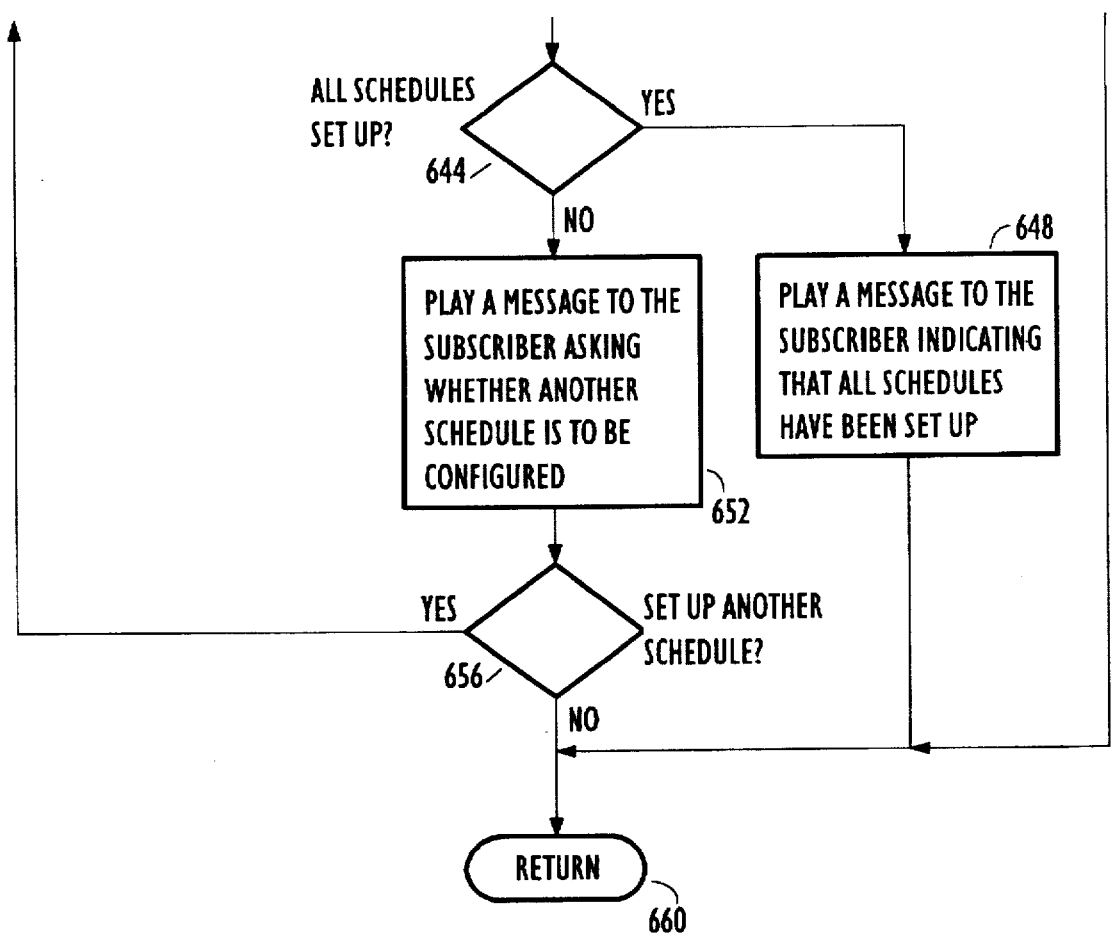
Figure 7:
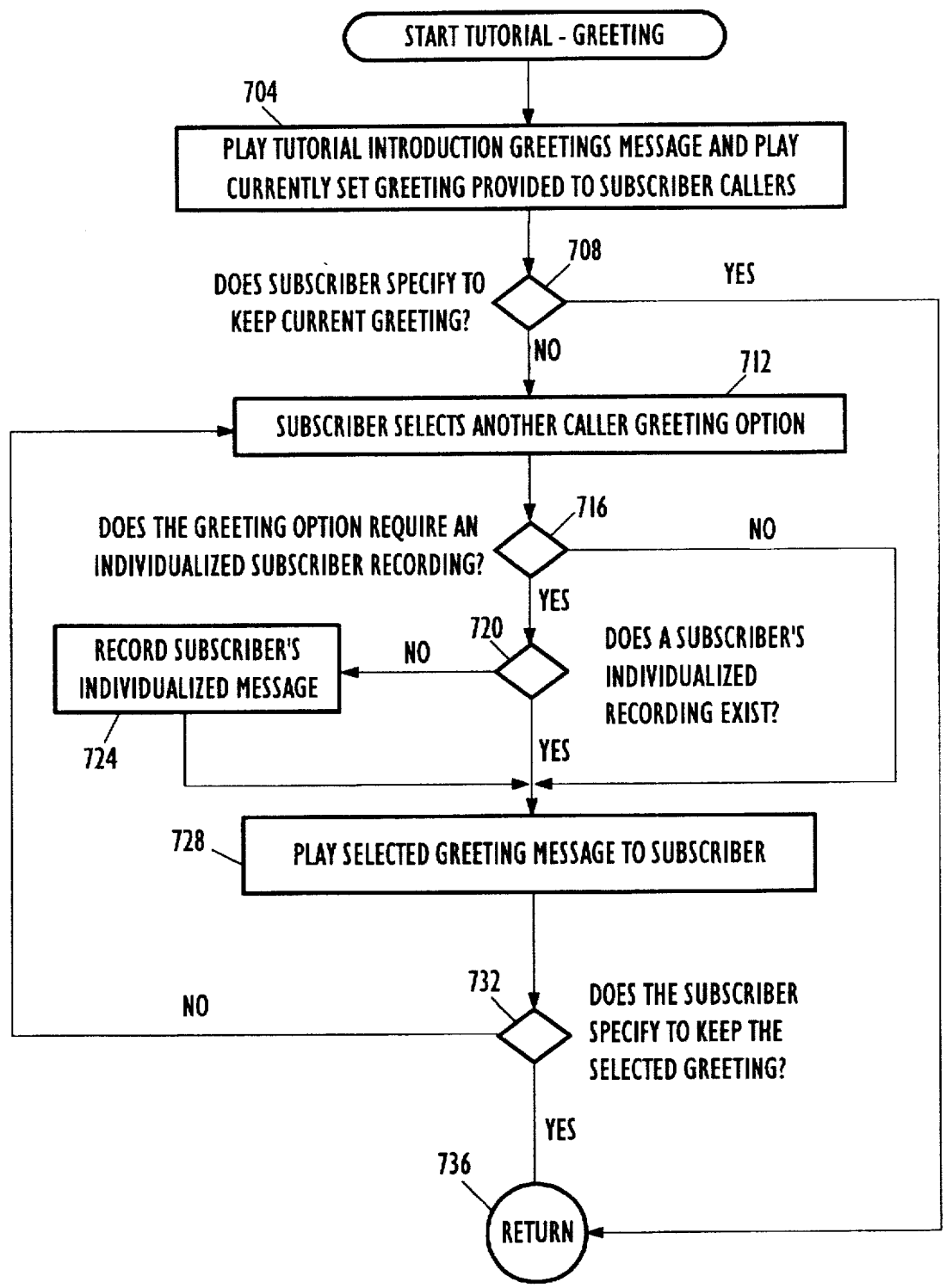
FIG. 7 is a flowchart of the high level steps performed when the subscriber interacts with a tutorial program for setting a call screening greeting for subscriber callers.
Figure 8:
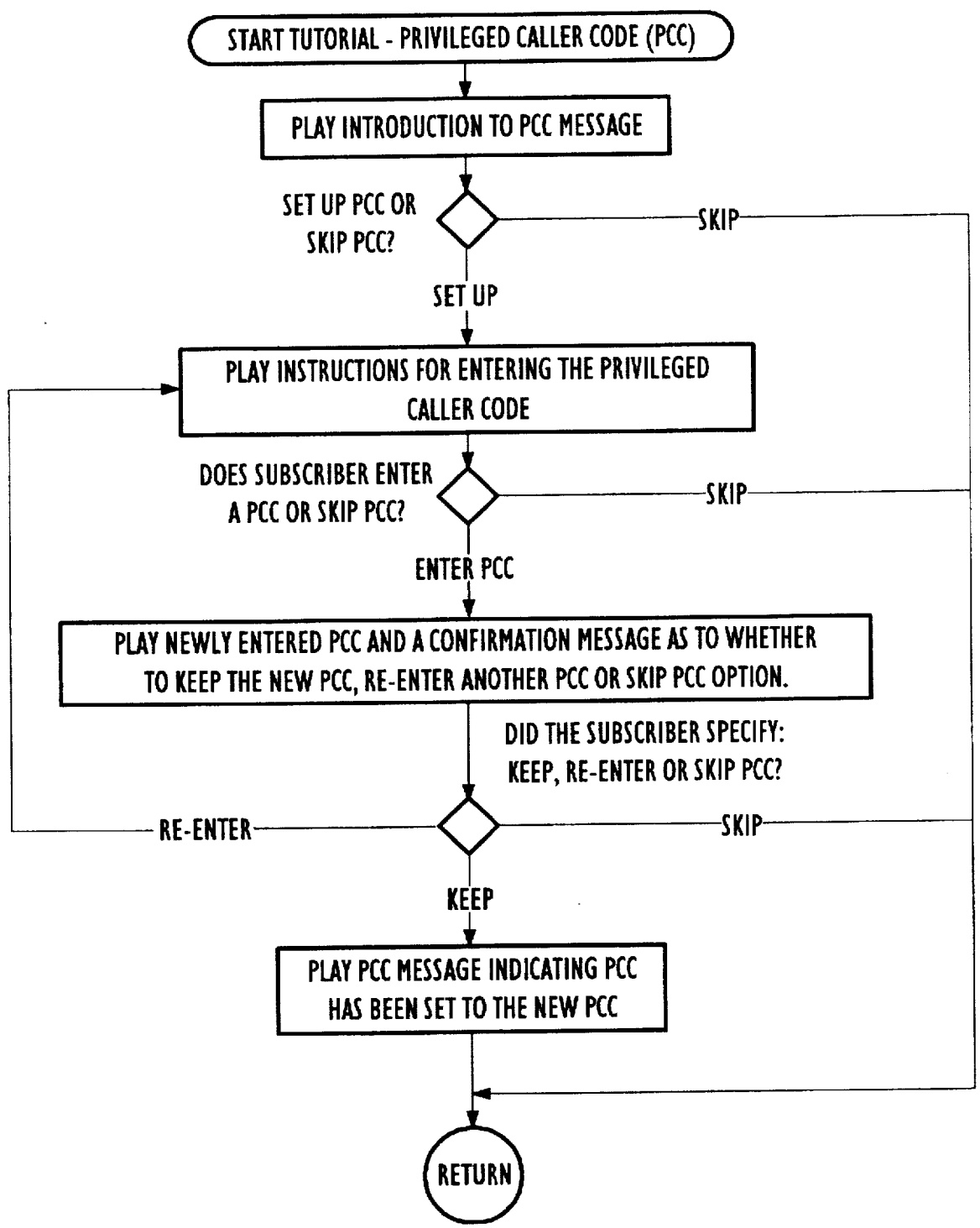
FIG. 8 is a flowchart of the high level steps performed when the subscriber interacts with a tutorial program of the present invention for entering a privileged caller code that allows subscriber callers to circumvent the call screening capabilities of the present invention when the privileged caller code is entered.
Figure 9:
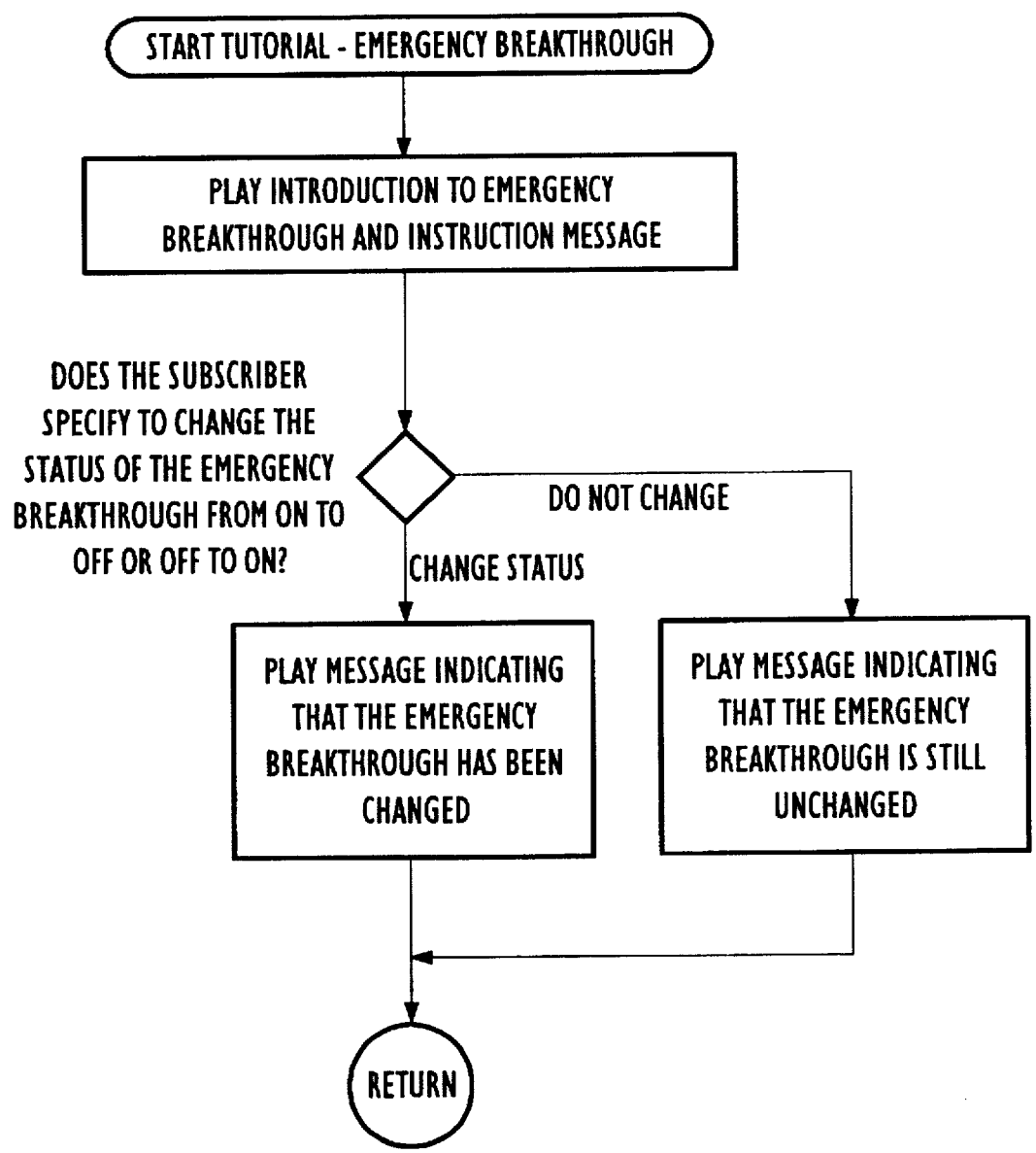
FIG. 9 is a flowchart of the high level steps performed when the subscriber interacts with a call screening tutorial program of the present invention for activating and/or deactivating a call screening emergency breakthrough feature of the present invention.

FIGS. 6-9 provide illustrative examples of flowcharts for call screening tutorial features. In particular, FIG. 6 provides the high level steps for configuring the subscriber's call screening schedules. FIG. 7 provides the high level steps allowing the subscriber to enter and/or select a greeting message for a caller. FIG. 8 provides the high level steps allowing the subscriber to enter the privileged caller code that has previously been described. FIG. 9 provides the high level steps that allow the subscriber to activate and/or deactivate the emergency breakthrough call screening feature also discussed hereinabove.

Referring once again to FIG. 6, in step 604 an introductory message is played to the subscriber indicating that this call screening tutorial feature is to be used for configuring call screening schedules. Further, this step also requests a response from the subscriber as to whether the subscriber desires to continue with this feature or to skip it. Thus, in step 608 a determination is made as to the subscriber's response. If the subscriber indicates a desire to skip the remainder of this tutorial feature, then a return in step 660 is performed wherein the flow of control is returned to FIG. 5. Alternatively, in step 612 instructions are provided to the subscriber about how to select a schedule in which times are to be entered. Note that in the current invention embodiment, there are a maximum of two schedules that can be configured for the days of the week Monday through Friday and an additional two schedules that may be configured for the weekend days Saturday and Sunday. In step 616, a determination is made as to whether the subscriber has selected a schedule to be filled in or has indicated a desire to skip the remainder of this tutorial feature. Assuming that the subscriber has selected a schedule, then steps 620 through 636 are repeated until the subscriber has entered all desired time periods when the call screening service is to be active in screening calls. Once all such time periods have been entered for this schedule, in step 640 a message is played to the subscriber indicating when the newly entered schedule will commence screening calls when the schedule is activated. Subsequently, in step 644 a determination is made as to whether there are further schedules that the subscriber may set up. If all such schedules have been configured, then step 648 is performed wherein a message is played to the subscriber indicating that all schedules have been set up and subsequently the return of step 660 is performed. Alternatively, if there are further schedules which the subscriber may configure, then a message indicating that there are potentially further schedules that may be configured is played to the user in step 652 and in step 656 a determination is made as to whether the subscriber has input information indicating that another schedule should be configured. If so, then the flow of control loops back to step 612 to configure a further schedule. Alternatively, the return in step 660 is performed.

Referring again to FIG. 7, in step 704 an introductory tutorial message is played to the subscriber indicating that a caller greeting message may be set up using this tutorial feature. Note that since the present invention includes a default caller greeting message, the subscriber has the option, in response to the message played in step 704, to use this default greeting. Thus, in step 708 a determination is made as to whether the subscriber has indicated that another greeting message other than the default (or other currently active) message should be used. Thus, in step 712 the subscriber is provided with a predetermined number of greeting options from which to select one. Following such a selection, steps 716 through 724 allow the subscriber to record an individualized caller greeting message if the subscriber selected greeting option provides for such individualization. Subsequently, in step 728 the complete greeting message is played to the subscriber and the subscriber is requested to confirm or reject that the present greeting message is the one desired. Thus, in step 732 a determination is made as to whether the subscriber has indicated that the present greeting message should be used. If not, then the steps 712 through 732 are again repeated until an affirmative response is entered by the subscriber in step 732, thereby causing the return of step 736 to be performed.

Given the above descriptions of the tutorial call screening features of FIGS. 6 and 7, it is believed that one skilled in the art can readily follow the flowcharts of FIGS. 8 and 9 for the configuring of the privileged caller code and the emergency breakthrough, respectively.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with various modifications required by their particular application or uses of the invention. It is intended that the appended claims be construed to include alternative embodiments to the extent permitted by the prior art.

What is claimed is:

1. A method for configuring a call screening service, comprising:

receiving a call from a subscriber;

providing a call screening tutorial, having one or more call screening tutorial announcements related to configuring a plurality of call screening features, playing said one or more call screening tutorial announcements which the subscriber has not provided an effective response to in one or more previous calls;

determining whether the subscriber has provided an effective response to said one or more call screening tutorial announcements that are played to the subscriber;

playing the names of the call screening service features that the subscriber can configure; and receiving an input from the subscriber relating to the call screening service feature the user would like to configure.

2. A method, as claimed in claim 1, wherein said plurality of call screening features includes at least one of: (a) activating said call screening service until further notice, (b) deactivating said call screening service until further notice, (c) activating said call screening services for a predetermined time interval, (d) deactivating said call screening services for a predetermined time interval, (e) providing at least one call screening schedule, (f) providing one or more recorded announcements for callers, (g) entering a privileged caller code, (h) activating an emergency breakthrough for allowing callers to contact the subscriber when there is an emergency and said call screening service is activated, and (i) deactivating said emergency breakthrough for said call screening service.

* * * * *

UNITED STATES PATENT AND TRADEMARK OFFICE
CERTIFICATE OF CORRECTION

PATENT NO. : 5,757,899
DATED : May 26, 1998
INVENTOR(S) : Joni W. Boulware, Peggy S. Schwend, Joshua D. Staller It is certified that error appears in the above-identified patent and that said Letters Patent is hereby corrected as shown below:

On the title page, item [75]: First inventor should read

--Joni W. Boulware--.

Signed and Sealed this

Twenty-sixth Day of January, 1999

Attest:

Attesting Officer

*Acting Commissioner of Patents and Trademarks*